(12) United States Patent
Strutt et al.

(10) Patent No.: US 12,047,194 B2
(45) Date of Patent: Jul. 23, 2024

(54) VOICE ASSISTANT

(71) Applicant: Elliptic Laboratories AS, Oslo (NO)

(72) Inventors: Guenael Thomas Strutt, San Francisco, CA (US); Anthony Bernard Padua, San Francisco, CA (US)

(73) Assignee: Elliptic Laboratories AS, Oslo (NO)

( * ) Notice: Subject to any disclaimer, the term of this patent is extended or adjusted under 35 U.S.C. 154(b) by 645 days.

(21) Appl. No.: 17/267,630

(22) PCT Filed: Aug. 29, 2019

(86) PCT No.: PCT/NO2019/050173
§ 371 (c)(1),
(2) Date: Feb. 10, 2021

(87) PCT Pub. No.: WO2020/046137
PCT Pub. Date: Mar. 5, 2020

(65) Prior Publication Data
US 2021/0328824 A1    Oct. 21, 2021

Related U.S. Application Data

(60) Provisional application No. 62/725,407, filed on Aug. 31, 2018.

(30) Foreign Application Priority Data

Sep. 18, 2018 (NO) .................................... 20181210

(51) Int. Cl.
*H04L 12/28* (2006.01)
*G01S 15/08* (2006.01)
(Continued)

(52) U.S. Cl.
CPC ............ *H04L 12/282* (2013.01); *G01S 15/08* (2013.01); *G06F 3/167* (2013.01); *G10L 15/22* (2013.01);
(Continued)

(58) Field of Classification Search
CPC ... H04L 12/282; H04L 12/2827; G01S 15/08; G06F 3/167; G10L 15/22; G10L 2015/223
See application file for complete search history.

(56) References Cited

U.S. PATENT DOCUMENTS 7,424,532 B1 * 9/2008 Subbiah ............... H04L 41/0886
709/225
8,340,975 B1 * 12/2012 Rosenberger ........... G10L 15/22
704/274

(Continued)

FOREIGN PATENT DOCUMENTS

EP         2551763 A1      1/2013
WO    WO-2018053327 A1    3/2018

OTHER PUBLICATIONS

Versini, Pascal; International Search Report; PCT/NO2019/050173; dated Nov. 12, 2019; 3 pages.

(Continued)

*Primary Examiner* — Eric Yen
(74) *Attorney, Agent, or Firm* — Bradley Arant Boult Cummings LLP

(57) ABSTRACT

Present teachings relate to a method for controlling a service running at least partially on an electronic device, the method comprising the steps of: —Determining, using a proximity sensor in the electronic device, a first parameter indicative of the physical distance between the electronic device and a user; and—Adapting at least one operation of the electronic device dependent upon the first parameter.

19 Claims, 1 Drawing Sheet

(51) Int. Cl.
  *G06F 3/16* (2006.01)
  *G10L 15/22* (2006.01)
(52) U.S. Cl.
  CPC .... H04L 12/2827 (2013.01); *G10L 2015/223* (2013.01)

(56) References Cited

U.S. PATENT DOCUMENTS

| | | | |
|---|---|---|---|
| 8,775,103 B1 | 7/2014 | Jayaraj et al. | |
| 9,749,583 B1 | 8/2017 | Fineberg et al. | |
| 9,910,487 B1* | 3/2018 | Abrams | G06F 3/01 |
| 10,057,725 B2* | 8/2018 | Murphy | H04W 4/021 |
| 10,425,780 B1* | 9/2019 | Devaraj | G10L 15/22 |
| 2008/0140840 A1* | 6/2008 | Hamilton | H04L 67/56 |
| | | | 455/414.2 |
| 2008/0281670 A1* | 11/2008 | Boss | G06Q 20/20 |
| | | | 705/16 |
| 2014/0095177 A1* | 4/2014 | Kim | G08C 17/02 |
| | | | 704/275 |
| 2015/0006184 A1* | 1/2015 | Marti | G10L 15/28 |
| | | | 704/275 |
| 2015/0112691 A1* | 4/2015 | LeBeau | H04M 1/72403 |
| | | | 704/275 |
| 2015/0348548 A1* | 12/2015 | Piernot | G10L 15/26 |
| | | | 704/235 |
| 2016/0077794 A1* | 3/2016 | Kim | G10L 15/20 |
| | | | 704/275 |
| 2016/0284350 A1 | 9/2016 | Yun et al. | |
| 2017/0076720 A1 | 3/2017 | Gopalan et al. | |
| 2017/0076721 A1 | 3/2017 | Bargetzi et al. | |
| 2017/0083281 A1 | 3/2017 | Shin | |
| 2017/0083285 A1 | 3/2017 | Meyers et al. | |
| 2017/0345167 A1* | 11/2017 | Ard | G06F 3/012 |
| 2018/0176364 A1* | 6/2018 | Van Dorp Skogstad | |
| | | | H04M 1/035 |
| 2018/0210640 A1* | 7/2018 | Vijay Kumar | G06F 3/04883 |
| 2018/0211665 A1 | 7/2018 | Park et al. | |
| 2018/0261067 A1* | 9/2018 | Bostick | G06F 3/011 |
| 2018/0268814 A1 | 9/2018 | SaganeGowda et al. | |
| 2018/0277107 A1* | 9/2018 | Kim | G10L 15/04 |
| 2023/0025202 A1* | 1/2023 | Rizzardini | G01V 3/088 |

OTHER PUBLICATIONS

Wikipedia, "Ultrasound," https://en.wikipedia.org/w/index.php?title=Ultrasound&oldid=853516644, Apr. 24, 2023, 15 pages.
Wikipedia, "Ultrasonic transducer," https://en.wikipedia.org/w/index.php?title=Ultrasonic_transducer&oldid=795235147, Apr. 24, 2023, 4 pages.

* cited by examiner

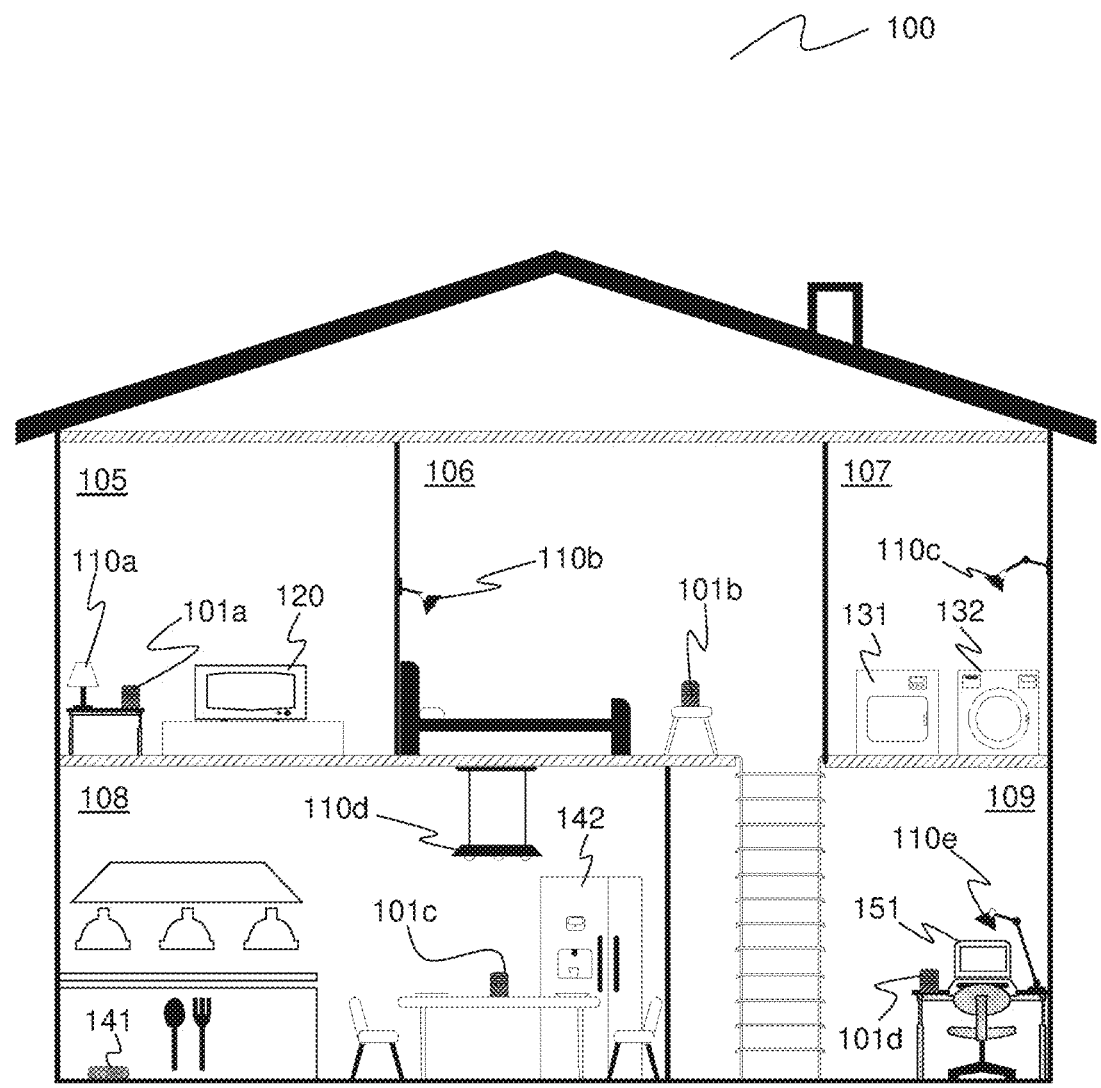

VOICE ASSISTANT

TECHNICAL FIELD

Present teachings relate generally to voice assistants for electronic devices.

BACKGROUND ART

Voice assistants can be commonly found implemented in electronic devices. Not only mobile devices such as smartphones, tablets, smartwatches, laptops and portable speakers may be running a voice assistant, but also video streaming devices and home audio or video systems may have a voice assistant service that can perform certain tasks for the user. In addition, devices such as vehicles or cars, appliances, smart clothing may also be implemented with a voice assistance service.

Smart speakers are such electronic devices in which a voice assistant service is perhaps the key enabler for making such devices smart or intelligent.

Certain audiovisual ("AV") systems or audio systems such as smart speakers may also allow multi-room operation where the user may have a plurality of smart speakers installed in the same house. Each speaker may be placed in a different room or location in the house. Such a setup may allow playing music through one or more of the speakers or playing a so called multi-room audio. Furthermore, a multi-room setup may provide the user with a better availability of a voice assistant service as compared to for example, requiring the user to come within a certain range of a single smart speaker or electronic device for accessing the voice assistant service.

Some electronic devices or smart speakers may even be set up as Internet-of-Things ("IoT") hubs for controlling other smart devices.

In setups where a plurality of voice assistants is connected to the same network, for example in the same home, there can be a need to identify the proximity of the user. Such a solution is discussed in U.S. Pat. No. 8,775,103 where the devices decide which is closest to the person giving the voice commands. This may be needed to identify, for example, which electronic device should execute an operation based on the audio command issued by the user. As it can be appreciated, an inaccurate detection of the user proximity can hinder proper control of the device and negatively affect user experience.

SUMMARY

At least some problems inherent to the prior-art will be shown solved by the features of the accompanying independent claims.

Thus the invention involves the use of a method as well as a device for controlling an operation on an electronic device is novel and inventive in its own right. This way it is possible to control a service running at least partially on an electronic device, where a proximity sensor in the electronic device determines a first parameter indicative of the physical distance between the electronic device and a user and adapts a least one operation of the electronic device dependent upon, or according to, the first parameter.

The operation may involve a number of different types, such as changing the volume played by the device according to the distance to the user, changing the content on a screen when the user is sufficiently close to allow operation through the screen. When using several devices with loudspeakers the operation of them based on the distance parameters may allow seamless transition from one speaker to the next without any fading of the sound level. Other possible operations would include controlling an automation framework or controlling an appliance.

Viewed from a perspective, there can be provided a method for controlling a voice assistant service running at least partially on each electronic device within a plurality of electronic devices, each electronic device being placed at a distinct location and the electronic devices being operatively linked through the voice assistant service, the method comprising the steps of:

Receiving at a first electronic device a voice command from a user;

Calculating, using a first proximity sensor in the first electronic device, a first parameter indicative of the physical distance between the first electronic device and the user;

Receiving at a second electronic device the voice command from the user;

Calculating, using a second proximity sensor in the second electronic device, a second parameter indicative of the physical distance between the second electronic device and the user;

Analyzing the first parameter relative to the second parameter and based upon the analysis determining the electronic device closest to the user; and Carrying out an operation, in response to the voice command, using the voice assistant service running on the electronic device closest to the user According to an aspect the electronic devices are operatively interconnected via at least one network. The voice assistant service is having access to at least some of the at least one network. Preferably, the voice assistant service has access to internet.

Viewed from another perspective, there can be provided an electronic device for running a voice assistant service, the electronic device comprising:

a proximity sensor for determining the presence of a user;

a network module for connecting the electronic device to at least one network;

a microphone for receiving a voice command from the user;

a processing unit and a memory for executing at least a part of the voice assistant service, wherein the proximity sensor is configured to generate a first parameter indicative of the physical distance between the electronic device and the user;

the network module is configured to receive, from an another electronic device, a second parameter indicative of the physical distance between the user and the another electronic device;

the processing unit is configured to analyze the first parameter relative to the second parameter for determining which of, the electronic device, or the another electronic device is closest to the user; and the processing unit is further configured to carry out an operation, in response to the voice command, if the electronic device is closest to the user.

As will be appreciated, by saying that the device is closest to the user, it is meant that the device has the shortest physical distance to the user.

According to another aspect, the electronic device or at least one of the electronic devices are also configured to operatively link to an other appliance or an automation framework through the at least one network. The other appliance is for example, one or more of: whitegoods or brown goods, such as, washer, dryer, vacuum cleaner, TV, coffee machine, water heater, refrigerator, etc. 142. The automation framework can for example be, one or more of any internet-of-things ("IoT") framework such as IoT enabled lighting control, home monitoring, temperature control, ventilation control etc. It will be understood that the IoT framework comprises at least one IoT device. The framework also comprises an interface, such as an Application Programming Interface (API), for controlling the IoT device.

According to another perspective, there can be provided an arrangement comprising a plurality of the electronic devices, the electronic devices configured to operatively link through the voice assistant service. The electronic devices are configured to be interconnected by the at least one network.

Viewed from yet another perspective, there can be provided an arrangement comprising a plurality of electronic devices, the electronic devices being configured to be interconnected by at least one network, and each of the electronic devices being configured to run at least a part of a voice assistant service, and at least some of the electronic devices in the plurality of electronic devices being configured to determine a proximal electronic device by distance measurements performed by using proximity sensors of the at least some of the electronic devices, the proximal electronic device being the electronic device closest to the user, wherein the proximal electronic device is configured to carry out an operation, using the part of a voice assistant service running on the proximal electronic device, in response to the voice command.

It would be clear that for an electronic device, for example, a first electronic device, the first electronic device being designated the closest (or proximal) device is a dynamic state, which is dependent upon the present location of the user. Accordingly, as the user moves towards a second electronic device and away from the first electronic device, the second electronic device becomes the closest device if the physical distance between the second electronic device and the user is shorter than the physical distance between the first electronic device and the user. The designation of the closest device is hence removed from the first electronic device when the physical distance between the first electronic device and the user becomes larger than the physical distance between the second electronic device and the user. The designation device can be provided, for example, by a token-based system or any such parameter managed by the voice assistant service to mark the closest (or proximal) electronic device at any given time.

According to an aspect of the arrangement, the arrangement also comprises at least one appliance and/or automation framework that is operatively linked to at least one of the electronic devices through at least one of the at least one network. The other appliance is for example, one or more of: whitegoods or brown goods, such as, washer, dryer, vacuum cleaner, TV, coffee machine, water heater, refrigerator, etc. 142. The automation can for example be, one or more of any internet-of-things ("IoT") device such as IoT enabled lighting, alarm system, thermostat, fan, ventilation system, etc.

According to an aspect, the first parameter or the second parameter is generated when the user arrives or is present within the field-of-view ("FoV") of the respective proximity sensor. The first parameter or the second parameter may even be generated in response to the user leaving a field-of-view of a proximity sensor in an electronic device.

It will be understood that by saying of the respective proximity sensor, it is meant that the parameter is generated by the processing unit of the electronic device within the FoV of which the user arrives. Similarly, if the user happens to arrive or be in FoVs of multiple electronic devices, each of the multiple electronic devices may generate a parameter indicative of the physical distance to the user. Additionally or alternatively, the user entering or leaving a FoV of an electronic device may trigger a calculation or measurement of a parameter in another electronic device. This can, for example, be used to trigger measurements in the another electronic device where the user is expected to arrive, and/or calibrating the measurements by measuring a response of the proximity sensor without the user present, and/or improving the robustness of measurements by correlating response from nearby electronic devices.

According to another aspect, the first parameter or the second parameter is generated in response to the reception of the voice command at the respective electronic device.

It will be understood that by saying of the respective electronic device, it is meant that the parameter is generated by the processing unit of the electronic device where the voice command is received. Similarly, if multiple electronic devices receive the voice command, each may generate a parameter indicative of the physical distance to the user in response to the reception of the voice command.

According to an aspect, the least one network is one or more of the types: wireless such as Bluetooth®, WiFi™, acoustic. Alternatively, or in addition, the least one network may even be a wired network. Any of the wireless or wired network may have access to, or be connected to, the internet. Further discussion with regards to the types of networks is not essential to this disclosure. A skilled person will realize that the scope or generality of the present teachings can extend to any network type, individually or in combination with other types. It will further be appreciated that by saying that the electronic devices are interconnected through at least one network, both possibilities, i.e., being connected simultaneously to different networks, or having an indirect connection serially through multiple networks is covered.

According to an aspect, the analysis of analyzing the first parameter relative to the second parameter includes one or more of operations: correlation, subtraction, comparison, pattern recognition.

As stated above the operation may be one or more of: controlling the automation framework, controlling the appliance, controlling playback of music, adapting the playback of music dependent upon, or according to, the first parameter and/or the second parameter. It will be understood that by saying controlling, it is meant switching-on, or switching-off, switching to a different mode of operation, or adjusting the operation depending on the first parameters of the devices.

According to an aspect, the electronic device is configured to issue a notification to the user in response to the electronic device becoming the closest (or proximal) device. The closest device may further be configured to offer to deliver a message to the user. The message may for example be an unread text message, missed call, weather, outcome of a sports event, offering the user to have audio playback (music, podcast, etc.) follow the user when changing rooms, or the message can even be a suggestion to perform a new operation based upon pre-determined interests of the user.

According to another aspect, in response to the electronic device becoming the closest (or proximal) device, the closest device is configured to initiate a timer with a pre-determining time-period. When the time-period expires, the closest device is configured to deliver a notification to the user asking the user if any one or more appliance(s) and/or automation framework(s) in another room should be switched off. If the user provides a voice confirmation, the closest device is configured to carry out at least one another operation, using the part of a voice assistant service running on the closest electronic device, in response to the voice confirmation.

According to an aspect, at least one appliance and/or at least one application framework and/or an IoT device is automatically manipulated in response to the designation of the proximal device. By automatic manipulation, it is meant switching-on and/or switching-off and/or switching to another mode of operation of said appliance, framework, or IoT device. Accordingly, lighting in a remote room, appliance in a remote room, etc., may be automatically switched-off or switched to a lower power mode (e.g., dimmed) to save power, or the light may be adjusted depending on where in the room the user is located. Similarly, at least one lighting, appliance, or device may be switched-on in a room where the user has arrived or is expected to arrive shortly.

According to another aspect, some of the electronic devices may also be manipulated (i.e., configured to enter a standby state or being woken from the standby state) in response to a certain electronic device becoming the proximal device. By this it will be understood that if the proximal device is at such a large distance from some of the other electronic devices that they cannot be used by the user while the user is in proximity of the proximal device, such devices or remote electronic devices may be switched to a standby mode or state in response to the proximal device being designated. Similarly, as the user then moves towards the direction of the remote electronic devices, at least some of the remote electronic devices are reactivated or woken-up from standby. The reactivation may be in response to the user moving away from the proximal device, either within or outside the FoV of the proximal device. According to an aspect, in response to the movement of the user within the FoV of the proximal device, at least some of the electronic devices neighboring the proximal device are be configured to initiate distance measurements. For example, in response to the proximal device detecting the user moving away from the proximal device, at least some of the electronic devices neighboring the proximal device may start distance measurements. As previously discussed, such subsequent distance measurements may result in one of the neighboring electronic devices being designated the proximal device in response to it being determined by the subsequent distance measurements that the one of the neighboring electronic devices is the electronic device closest to the user.

Accordingly, the method, or the electronic device, or the arrangement, can help save power by switching off or disabling the appliances, devices, or automation frameworks that are not in use, and can improve user experience. This can also increase convenience for the user as the user is not required to return to another room or location to switch off the unused appliances. Moreover, according to the present teachings, the electronic device or arrangement of such devices can help user in achieving power saving goals by being aware of where the user is at a certain time, and which appliances and automation frameworks are not required to be active in response to the user's present location (determined at least by the proximal electronic device). In addition, the electronic device or arrangement of such devices may estimate the time that the user is likely to spend in a certain room or location depending upon the user inputs to the voice assistant service. The estimation may further be used to calculate which of the appliances or automation frameworks can be switched-off.

The notification is preferably delivered as an audio. The audio is preferably played by the closest device, but it may alternatively or in addition be played by another audio device within audible distance from the user or the individual volumes may be adjusted according to the distance between the different devices. The notification may even be in visual form, such as switching on of a display or a video screen.

According to another aspect, in response to the electronic device becoming the closest device, a notification or an alarm is re-routed to the electronic device or to a specific accessory.

According to another aspect, a given plurality of electronic devices is used to track the location of the user. Such tracking may be done, for example, by using a sequence of the electronic devices that became proximal devices within a given time period. Accordingly, the closest electronic device may recognize the identity of the user. Alternatively, or in addition, the identity may be estimated by a voice recognition service. According to a further aspect, a different electronic device is configured to accept an enquiry voice command from another user enquiring the location of the user. The different electronic device is configured to report the location of the user based upon the designation of the closest device.

According to an aspect, the designation of the closest (or proximal) electronic device is user specific. Accordingly, the presence of a first user designates a first closest electronic device and the presence of a second user designates a second closest electronic device. In other words, the first closest electronic device is the electronic device with the shortest physical distance from the first user, whereas, the second closest electronic device is the electronic device with the shortest physical distance from the second user.

The proximity sensor may be acoustic detection based. Alternatively, or in addition, the teachings can also apply to other kinds of proximity detection systems such as those based on electric field, light, magnetic field that allow distance measurement. It is preferred that proximity detection system is based on transmission and receiving of acoustic signals. Accordingly, in this preferred mode, the proximity detection mode comprises the transmission, reflection and detection of acoustic, particularly ultrasonic signals. The proximity sensor may include a plurality of sensors. The proximity sensor may even include a combination of various kinds of proximity detection systems. For example, a combination of an IR sensor and an acoustic sensor.

An acoustic proximity detection system, or more specifically an ultrasound-sensor based proximity detection system comprises at least one transmitter and at least one receiver. The transmitter is used for transmitting an ultrasound signal, and the receiver is used for receiving at least some portion of the ultrasound signal being reflected by an object, i.e., a reflected signal or an echo.

As will be appreciated, the transmitter and receiver may either be different components or alternatively they can be the same transducer that is used in a transmit mode for transmitting the ultrasound signal and then in a receive mode for receiving the reflected ultrasound signal. If the transmitter and receiver are different components, they may be placed in the same location, or they may be installed at different locations on the electronic device. Furthermore, the electronic device may comprise a plurality of transmitters and/or a plurality of receivers. Multiple transmitter-receiver combinations may be used to extract spatial information related to the object and/or surroundings.

According to an aspect, parameter indicative of the distance between the electronic device and the user is computed by processing a measured signal. The measured signal is dependent upon, e.g., proportional to, the reflected signal or echo received by the receiver, or in general, by the proximity sensor.

The processing of the measured signal or a plurality of measured signals received by the proximity sensor can be done by a processing unit such as a computer processor. The processing unit may either be the same processor that is used for processing voice signals received by the electronic device, or it may be a separate processor. A usage of the term processing unit in this disclosure thus includes both alternatives, i.e., separate processors and same processor. The processing unit can be any type of computer processor, such as a DSP, an FPGA, or an ASIC.

The range and/or sensitivity of the proximity sensing system may either be limited according to component specifications, or it may be statically or dynamically adapted by the processing unit to a certain value according to processing requirements and/or use case of the electronic device.

According to another aspect, the method may also comprise transmitting data related to the user to another electronic module of the electronic device. The user related data may include one or more of: position, distance, speed, estimated trajectory, and projected trajectory. Another electronic module may be a hardware or software module, and may include any one or more of, application programming interface ("API"), and sensor fusion module. For example, data related to either one or any of, distance, speed of movement, position, and gesture type may be transmitted used by the processing unit to estimate the use case of the electronic device.

According to another aspect, the method also comprises receiving data from at least one of the other sensors or modules in the electronic device for improving the robustness of the control of the electronic device. The other sensors or modules may include any one or more of, microphone, accelerometer, inertial sensor, light sensor, or any other sensor or modules, if available, related to a sensor fusion module in the electronic device.

The processing of the echo signal may be based on time of flight ("TOF") measurements between the transmitted ultrasound signal and the corresponding received reflected signal. The processing of the echo signal may also be based on the amplitude of the measured signal, or phase difference between the transmitted signal and the measured signal, or the frequency difference between the transmitted signal and the measured signal, or a combination thereof. The transmitted ultrasound signal may comprise either a single frequency or a plurality of frequencies. In another embodiment, the transmitted ultrasound signal may comprise chirps.

It will be appreciated that the method for controlling an operation on an electronic device is novel and inventive in its own right. Accordingly, there can be provided a method for controlling a service running at least partially on an electronic device, the method comprising the steps of:

Determining, using a proximity sensor in the electronic device, a first parameter indicative of the physical distance between the electronic device and a user;

Adapting at least one operation of the electronic device dependent upon, or according to, the first parameter.

It will be appreciated that the service is preferably a voice assistant service. Examples for the operation and other aspects that are provided in this disclosure apply here as well. For instance, the operation can be a music playback the volume of which is adapted proportional to the first parameter, or the distance of the user from the electronic device. Other examples of the operation are, issuing of notifications and read out of messages dependent on the distance of the user from the electronic device.

Based on the above, it will further be appreciated that an electronic device capable of detecting the user's presence is also novel and inventive in its own right. Accordingly, viewed from yet another perspective, there can be provided an electronic device for running a voice assistant service, the electronic device comprising:

a proximity sensor for determining the presence of a user;

a microphone for receiving a voice command from the user;

a processing unit and a memory for executing at least a part of the voice assistant service, wherein the proximity sensor is configured to generate a first parameter indicative of the physical distance between the electronic device and the user; and the processing unit is configured to adapt at least one operation of the electronic device dependent upon, or according to, the first parameter.

It will be understood that the at least one operation is either being executed at least partially in the electronic device or is to be executed in the electronic device.

The method steps herein disclosed are preferably implemented using a computing unit such as a computer or a data processor. The computing unit preferably comprises a memory for storing and executing the instructions as provided by the method steps herein disclosed.

Viewed from another perspective, there can also be provided an electronic device configured to implement any of the method steps herein disclosed.

Viewed from another perspective, there can also be provided an electronic device or an arrangement comprising electronic devices configured to implement any of the method steps herein disclosed.

Viewed from yet another perspective, there can also be provided a computer software product for implementing any method steps disclosed herein. Accordingly, the present teachings can also provide a computer readable program code having specific capabilities for executing any method steps herein disclosed, or to a non-transitory computer-readable medium storing computer software which, when executed on a processing system in an electronic device, causes the electronic device to execute any of the method steps disclosed herein.

The term electronic device includes any device, mobile or stationary. Accordingly, devices such as mobile phones, smartwatches, tablets, notebook computers, desktop computers, and similar devices fall within the ambit of the term electronic device in this disclosure. Preferably, the electronic device is a smart speaker capable of providing a voice assistant service. The electronic device can be executing any of the method steps disclosed herein. Accordingly, any aspects discussed in context of the method or process also apply to the product aspects in the present teachings and vice versa.

As can be appreciated, the present teachings can improve user experience of the electronic device such as smart speakers. Additional advantages such as loudspeaker volume being adaptable according to the user's position relative to the electronic device, loudspeaker playback delay being adaptable according to the user's position relative to the electronic device, and control of the automation framework according to the user's position can also be provided. More specifically, the necessity to have a restricted field-of-view or detection distance can be alleviated.

Example embodiments are described hereinafter with reference to the accompanying drawings.

BRIEF DESCRIPTION OF DRAWINGS

FIG. 1 shows a multi-room setup comprising a plurality of smart speakers

DETAILED DESCRIPTION

FIG. 1 illustrates a building shown as a house 100 in which a multi-room arrangement of smart speakers 101 is set up. The setup comprises a plurality of smart speakers 101a-101d that have been placed in different rooms of the house 100. It will be appreciated that any of the smart speakers 101a-101d can alternatively be any other kind of electronic device running a voice assistant service. Accordingly, each of the smart speakers 101a-101d comprises a sensing means or at least one sensor for detecting input acoustic signals. Such a sensing means or sensor is commonly a microphone that is used for converting an input acoustic signal to an input electrical signal. Such an input acoustic signal will, for example, be a voice command from a user. It will be understood that the smart speakers 101a-101d also comprise at least one loudspeaker for converting output electrical signals to output acoustic signals. Such an output acoustic signal will, for example, be a music being played by any of the speakers.

The house 100 comprises a living-room 105 in which a living-room speaker 101a is placed. The living-room 105 also has a living-room lamp 110a and a television ("TV") set 120. The house 100 further comprises a bedroom 106 that has a bedroom lamp 110b and a bedroom speaker 101b. The house 100 also comprises a laundry 107 that has a laundry lamp 110c, a washing machine or washer 132 and a dryer 131. In kitchen 108 of the house 100, a kitchen lamp 110d is installed and the kitchen 108 also has a kitchen speaker 101c, a robotic vacuum cleaner 141 and a refrigerator 142. In study 109 of the house 100, a study lamp 110e is installed and the study 109 also has a study speaker 101d and a computer 151.

The speakers 101a-101d are interconnected either directly through the same network or through a plurality of networks. The network can be any kind of network, wired or wireless, that allows data exchange between two or more of the electronic devices, for example, the network can be based on technologies such as wireless (e.g., "WiFi™"), or Bluetooth®, or power line communication ("PLC"), or it can even be an acoustic network. The network can even be a combination of such technologies. As discussed, in some cases, the various speakers may even be interconnected through different kinds of networks, e.g., some speakers are interconnected through a Bluetooth® connection, while others through a wired connection. By interconnected, it will be understood that speakers may even communicate with each other despite being on different kinds of networks.

An acoustic network preferably uses acoustic signals that are inaudible to the human ear. Such acoustic signals that are inaudible to the human ear can for example be ultrasonic signals. The network or the plurality of networks may even interconnect one or more of other appliances or automation framework in the house 100. The appliances are for example, the washer 132, the dryer, 131, the vacuum cleaner 141, the TV 120 and the refrigerator 142. The automation framework can for example be, IoT enabled lighting. In such case some or all of the lights 110a-110e are controllable through an IoT interface.

In addition, the computer 151 is also preferably connected to the network. It will be appreciated that components such as said speakers, automation frameworks, appliances and computer may either be directly connected to the same network, or indirectly connected or accessible through different kinds of networks. A choice of a particular network topology is not limiting to the scope of the present teaching, so by saying that the components are connected covers any kind of connection, direct or indirect between the components.

Now, assuming that a user is presently located in the living-room 105 where the user issues a vocal command or instruction. The vocal command will be received by the living-room speaker 101a, but it can happen that at least some portion of the vocal command is also received by the bedroom speaker 101b. The voice assistant service will then coordinate to identify which of the speakers or voice assistants is closest to the user. It may be determined, for example, by comparing the amplitude of the voice command received by the living-room speaker 101a with the amplitude of the voice command received by the bedroom speaker 101b. In normal scenario when the user issued the voice command from the living room 105, the amplitude of the voice command received by the living-room speaker 101a will be greater than the amplitude of the voice command received by the bedroom speaker 101b. The arrangement can thus determine that the user is closest to the living-room speaker 101a because the amplitude of the voice command received by the living-room speaker 101a was greatest.

In certain cases, such a determination based on amplitude of received voice signals may be inaccurate, for example, depending upon the direction which the user facing in while issuing the command, characteristics of the room and what kind of obstacles the voice signal faced while traveling towards each of the speakers.

Alternatively, or in addition, the determination may be based on comparing the phase difference between the voice signals received by each of the speakers. However, such an arrangement may also suffer from inaccuracies in determination on the position dependent, for example, upon the direction which the user facing in while issuing the command, characteristics of the room and the obstacles or path the voice signal faced while traveling towards each of the speakers.

In cases where the position of the user cannot be properly resolved in the arrangement, it may not be determined which electronic device or speaker should respond or take action upon receiving the voice command.

According to the present teachings a proximity sensor is provided in each of the speakers 101. The proximity sensor is capable of measuring the presence of the user within a pre-defined space around the speaker. The pre-defined space can also be called the field-of-view ("FoV") of the proximity sensor. The proximity sensor is preferably connected to a processing unit.

Whenever an object, preferably a user comes within the FoV of a proximity sensor on a speaker, the processing unit generates a proximity event.

The proximity event can be communicated to the other speakers or electronic devices directly or indirectly connected to the same network. Accordingly, the speaker which has generates the proximity event becomes the primary speaker for processing the requests from the user.

According to another aspect, the processing unit may also compute, continuously or intermittently, a distance value of the user. The distance value may represent the physical distance of the user from a specific speaker. As it will be appreciated, this can provide additional user related information to one or more of the speakers, which can be used to further enhance the user experience. For example, the distance of the user from a speaker can be used to set the volume of the speaker dependent upon, e.g., proportionally to, the distance. Accordingly, the speaker volume can be made to increase as the user moves away from the speaker such that the user perceives an essentially constant volume of audio received at the user's ears. Furthermore, in an arrangement of speakers, dependent upon, e.g., proportional to, one or more distance values from at least two speakers, a time-delay may be introduced in the playback from the speakers such that the audio played by the speakers arrives at the user's ears at nearly the same time.

According to another aspect, the speaker may comprise a plurality of sensors that can be used to estimate the orientation of the user with respect to the speaker. Such plurality of sensors may be a light-based sensor array such as a camera chip, or an array of acoustic sensors, preferably ultrasonic. Accordingly, the time delays or playback volume reaching the user's ears can be better tuned based on the orientation of the user's head or direction of the user's ears.

According to another aspect, the method may utilize machine learning and artificial intelligence ("AI") for recognizing and further improving the detection of the user and subsequent adapting of the volume and/or time delay.

Another advantage of distance measurement and user localization using the distance measurement can be that in response to the user's voice command, the speaker having the lowest unobstructed distance to the user can be used to process the command. It will be appreciated that the closest speaker can be determined either continuously, intermittently, or the determination may be triggered as per requirement, such as in response to a voice command. In other words the devices may be aware of the possible presence of the user as well as the distance to the user before the voice command is given.

According to another aspect, a series of distance measurements may be combined to compute a path of the user's movement. Alternatively, or in addition, the distance measurements may be used to extrapolate the user's path. An extrapolated path, i.e., the path the user is likely to move along shortly may be used to adapt at least some of the parameters related to the speakers that are within a certain distance of the path and/or the extrapolated path. The parameters may include, volume, activating or deactivating the voice assistant service, starting or stopping playback, or such. Additionally, the determination of the path and/or the extrapolated path may be used to control other components such as automation frameworks, appliances and computer that are directly or indirectly connected to the same network. For example, the arrangement may switch-on the lights in the room where the user is likely to enter within a given time, or drive the automated vacuum cleaner away from the extrapolated path of the user.

It will also be appreciated that, e.g., in response to a voice command by the user to switch on lights, the relevant lighting, e.g., that around the user may be switched-on without the user explicitly having to pronounce which lights are to be switched on. This can enhance the user experience by requiring shorter voice commands by the user. Moreover, the user is not required to remember the names of various lighting zones for switching-on the lights around the area where the user is present.

Various embodiments have been described above for a method for controlling a voice assistant service, an electronic device for executing the voice assistant service, and an arrangement comprising such devices. Those skilled in the art will understand, however that changes and modifications may be made to those examples without departing from the spirit and scope of the following claims and their equivalents.

Certain teachings are summarized in the following clauses.

Clause 1.

A method for controlling a voice assistant service running at least partially on each electronic device within a plurality of electronic devices, each electronic device being placed at a distinct location and the electronic devices being operatively linked through the voice assistant service, the method comprising the steps of:

Receiving at a first electronic device a voice command from a user;

Calculating, using a first proximity sensor in the first electronic device, a first parameter indicative of the physical distance between the first electronic device and the user;

Receiving at a second electronic device the voice command from the user;

Calculating, using a second proximity sensor in the second electronic device, a second parameter indicative of the physical distance between the second electronic device and the user;

Analyzing the first parameter relative to the second parameter and based upon the analysis determining the electronic device closest to the user; and Carrying out an operation, in response to the voice command, using the voice assistant service running on the electronic device closest to the user Clause 2.

Method according to clause 2, wherein the method also comprises:

one or more steps of calculating one or more other parameters indicative of the physical distance between one or more other electronic devices within the plurality of electronic devices and the user; and analyzing the first parameter, the second parameter and the one or more other parameters relative to each another and based upon the analysis determining the electronic device closest to the user.

Clause 3.

The method according to any of the above clauses, wherein at least one of the, step of calculating the first parameter, the step of calculating the second parameter, or any one of the one or more steps of calculating one or more other parameters is performed in response to the voice command.

Clause 4.

The method according to any of the clauses 1-2, wherein at least one of the, step of calculating the first parameter, the step of calculating the second parameter, or any one of the one or more steps of calculating one or more other parameters is performed continuously or intermittently.

Clause 5.

The method according to any of the clauses 1-2, at least one of the, step of calculating the first parameter, the step of calculating the second parameter, or any one of the one or more steps of calculating one or more other parameters is performed in response to the user entering or leaving at least one range of an electronic device, the range being a field-of-view of a proximity sensor in the electronic device.

Clause 6.

The method according to any of the clauses 3-5, wherein the analysis further comprises computing a path traversed by the user.

Clause 7.

The method according to any of the clauses 3-6, wherein the analysis further comprises computing an extrapolated path of the user, the extrapolated path being the path the user is likely to move along.

Clause 8.

The method according to any of the above clauses, wherein the operation is one or more of: controlling an automation framework, controlling an appliance, controlling playback of music, adapting the playback of music dependent upon the first parameter and/or the second parameter and/or the one or more other parameters.

Clause 9.

The method according to any of the above clauses, wherein at least one of the electronic devices in the plurality of electronic devices is an ultrasound enabled electronic device, the ultrasound enabled electronic device comprising at least one proximity sensor and at least one of the at least one proximity sensor being an ultrasound based proximity sensor comprising at least one transmitter and at least one receiver, wherein a parameter indicative of the physical distance between the user and the ultrasound enabled electronic device is computed by performing the steps of:

transmitting a transmit ultrasound signal from the transmitter, at least a portion of the transmit ultrasound signal being transmitted towards the user;

receiving a reflected signal with the receiver and generating a measured signal based upon the reflected signal, the reflected signal being a portion of the transmit ultrasound signal reflected by the user's body; and processing the measured signal to calculate the parameter indicative of the physical distance between the user and the ultrasound enabled electronic device.

Clause 10.

A method for controlling a service running at least partially on a first electronic device, the method comprising the steps of:

Determining, using a proximity sensor in the electronic device, a first parameter indicative of the physical distance between the first electronic device and a user;

Adapting at least one operation of the first electronic device dependent upon the first parameter.

Clause 11.

An electronic device for running a voice assistant service, the electronic device comprising:

a proximity sensor for determining the presence of a user;

a microphone for receiving a voice command from the user;

a processing unit and a memory for executing at least a part of the voice assistant service, wherein the proximity sensor is configured to generate a first parameter indicative of the physical distance between the electronic device and the user; and the processing unit is configured to adapt at least one operation of the electronic device dependent upon the first parameter.

Clause 12.

An electronic device for running a voice assistant service, the electronic device comprising:

a proximity sensor for determining the presence of a user;

a network module for connecting the electronic device to at least one network;

a microphone for receiving a voice command from a user; and a processing unit and a memory for executing at least a part of the voice assistant service, wherein the proximity sensor is configured to generate a first parameter indicative of the physical distance between the electronic device and the user;

the network module is configured to receive, from an another electronic device, a second parameter indicative of the physical distance between the user and the another electronic device;

the processing unit is configured to analyze the first parameter relative to the second parameter for determining which of, the electronic device, or the another electronic device is closest to the user; and the processing unit is further configured to carry out an operation, in response to the voice command, if the electronic device is closest to the user.

Clause 13.

An arrangement comprising a plurality of electronic devices, the electronic devices being configured to be interconnected by at least one network, and each of the electronic devices being configured to:

run at least a part of a voice assistant service, and at least some of the electronic devices in the plurality of electronic devices being configured to determine a proximal electronic device by distance measurements performed by using proximity sensors of the at least some of the electronic devices, the proximal electronic device being the electronic device closest to the user, wherein the proximal electronic device is configured to carry out an operation, through the part of a voice assistant service running on the proximal electronic device, in response to the voice command.

Clause 14.

The arrangement according to clause 13, wherein a second electronic device is configured to be the proximal device in response to subsequent distance measurements performed by using proximity sensors of the at least some of the electronic devices, it being determined by the subsequent distance measurements that the second device is the electronic device closest to the user.

Clause 15.

The arrangement according to clause 13 or 14, wherein the distance measurements or the subsequent distance measurements are configured to be performed:

continuously or intermittently; and/or in response to the user entering or leaving at least one range of an electronic device, the range being a field-of-view of a proximity sensor in the electronic device; and/or in response to the voice command.

Clause 16.

The arrangement according to any of the clauses 13-15, wherein the arrangement also comprises at least one appliance or automation framework, the at least one appliance or automation framework being operatively linked to at least one of the electronic devices through at least one of the at least one network.

Clause 17.

A computer software product having specific capabilities for executing the steps of:

Receiving at a first electronic device a voice command from a user;

Calculating, using a first proximity sensor in the first electronic device, a first parameter indicative of the physical distance between the first electronic device and the user;

Receiving at a second electronic device the voice command from the user;

Calculating, using a second proximity sensor in the second electronic device, a second parameter indicative of the physical distance between the second electronic device and the user;

Analyzing the first parameter relative to the second parameter and based upon the analysis determining an electronic device closest to the user; and Carrying out an operation, in response to the voice command, using the voice assistant service running on the electronic device closest to the user.

Clause 18.

A non-transitory computer-readable medium storing computer software which, when executed on a processing system in an electronic device, causes the electronic device to execute any of the method steps of any of the clauses 1-10.

The invention claimed is:

1. A method for controlling a service running at least partially on a first electronic device of a plurality of electronic devices, the method comprising:
   determining, using a proximity sensor in the first electronic device, a first parameter indicative of a physical distance between the first electronic device and a user;
   adapting at least one operation of the first electronic device dependent upon the first parameter;
   wherein the service is a voice assistant service running at least partially on each of the plurality of electronic devices, at least two of the plurality of electronic devices including a proximity sensor, each of the plurality of electronic devices placed at a distinct location and operatively linked through the voice assistant service;
   receiving, at the first electronic device, a voice command from a user;
   calculating, using a first proximity sensor in the first electronic device, the first parameter indicative of the physical distance between the first electronic device and the user;
   receiving, at a second electronic device of the plurality of electronic devices, the voice command from the user;
   calculating, using a second proximity sensor in the second electronic device, a second parameter indicative of a physical distance between the second electronic device and the user;
   analyzing the first parameter relative to the second parameter and, based upon the analyzing, determining an electronic device of the plurality of electronic devices closest to the user; and
   based on a physical distance to a closest electronic device, computing an extrapolated path of the user, the extrapolated path being a path the user is likely to move along; and
   activating operation of the second electronic device when the user is expected to move out of a field of view of the closest electronic device.

2. The method according to claim 1, comprising:
   one or more steps of calculating one or more other parameters indicative of a physical distance between one or more other electronic devices within the plurality of electronic devices and the user;
   analyzing the first parameter, the second parameter and the one or more other parameters relative to each other; and
   based upon the analyzing the first parameter, the second parameter and the one or more other parameters relative to each other, determining the electronic device closest to the user.

3. The method according to claim 2, wherein at least one of the following is performed in response to the voice command:
   the step of calculating the first parameter;
   the step of calculating the second parameter; and
   any one of the one or more steps of calculating one or more other parameters.

4. The method according to claim 3, wherein the analyzing the first parameter, the second parameter and the one or more other parameters relative to each other comprises computing a path traversed by the user.

5. The method according to claim 2, wherein at least one of the following is performed continuously or intermittently:
   the step of calculating the first parameter;
   the step of calculating the second parameter; and
   any one of the one or more steps of calculating one or more other parameters.

6. The method according to claim 5, wherein the analyzing the first parameter, the second parameter and the one or more other parameters relative to each other comprises computing an extrapolated path of the user, the extrapolated path being the path the user is likely to move along.

7. The method according to claim 2, wherein at least one of the following is performed in response to the user entering or leaving at least one range of an electronic device, the at least one range being a field-of-view of a proximity sensor in the electronic device:
   the step of calculating the first parameter;
   the step of calculating the second parameter; and
   any one of the one or more steps of calculating one or more other parameters.

8. The method according to claim 1, wherein the at least one operation is one or more of:
   controlling an automation framework; controlling an appliance; and
   controlling playback of music, adapting the playback of music dependent upon at least one of the first parameter and the second parameter.

9. The method according to claim 1, wherein at least one of the plurality of electronic devices is an ultrasound enabled electronic device, the ultrasound enabled electronic device comprising at least one proximity sensor and at least one of the at least one proximity sensor being an ultrasound based proximity sensor comprising at least one transmitter and at least one receiver, wherein the first parameter is computed by performing the steps of:
   transmitting a transmit ultrasound signal from the at least one transmitter, at least a portion of the transmit ultrasound signal being transmitted towards the user;
   receiving a reflected signal with the at least one receiver and generating a measured signal based upon the reflected signal, the reflected signal being a portion of the transmit ultrasound signal reflected by a body of the user; and
   processing the measured signal to calculate the first parameter.

10. An electronic device system for running a service, the electronic device system comprising:
    a plurality of electronic devices;
    a proximity sensor for determining presence of a user;

a microphone for receiving a voice command from the user and a processing unit for executing at least a part of a voice assistant service;

wherein the proximity sensor is configured to generate a first parameter indicative of a physical distance between an electronic device of the plurality of electronic devices and the user, the electronic device having a known field of view;

the electronic device system being configured to, at the receipt of the voice command, calculate a physical distance between each electronic device of the plurality of electronic devices and the user and select an electronic device of the plurality of electronic devices closest to the user; and wherein the electronic device system is configured to, based on the physical distance to the closest electronic device, compute an extrapolated path of the user, the extrapolated path being a path the user is likely to move along, and activating a second electronic device of the plurality of electronic devices when the user is expected to move out of a field of view of the closest electronic device.

11. The electronic device system according to claim 10, comprising:

wherein the electronic device is configured to receive, from another electronic device, a second parameter indicative of a physical distance between the user and the another electronic device;

wherein the processing unit is configured to analyze the first parameter relative to the second parameter for determining which of, the electronic device, or the another electronic device is closest to the user; and wherein the processing unit is further configured to carry out at least one operation, in response to the voice command, if the electronic device is closest to the user.

12. The electronic device system according to claim 11, wherein the electronic device system is configured to issue a notification to the user in response to the electronic device becoming the closest (or proximal) electronic device.

13. The electronic device system according to claim 12, wherein the closest electronic device is configured to offer to deliver a message to the user.

14. An arrangement comprising a plurality of electronic devices according to claim 10, the plurality of electronic devices being configured to be interconnected by at least one network, and each of the electronic devices being configured to:

run at least a part of a voice assistant service;

at least some of the electronic devices of the plurality of electronic devices being configured to determine a proximal electronic device by distance measurements performed by using proximity sensors of the at least some of the electronic devices, the proximal electronic device being an electronic device closest to the user; and wherein the proximal electronic device is configured to carry out an operation, through the part of a voice assistant service running on the proximal electronic device, in response to the voice command.

15. The arrangement according to claim 14, wherein a second electronic device is configured to be the proximal device in response to subsequent distance measurements performed by using proximity sensors of the at least some of the electronic devices, it being determined by the subsequent distance measurements that the second electronic device is the electronic device closest to the user.

16. The arrangement according to claim 15, wherein the distance measurements or the subsequent distance measurements are configured to be performed according to at least one of the following:

continuously or intermittently;

in response to the user entering or leaving at least one range of an electronic device of the plurality of electronic devices, the at least one range being a field-of-view of a proximity sensor in the electronic device of the plurality of electronic devices; and in response to the voice command.

17. The arrangement according to claim 14, wherein the arrangement also comprises at least one appliance or automation framework, the at least one appliance or automation framework being operatively linked to at least one of the electronic devices through at least one of the at least one network.

18. A non-transitory computer-readable medium having instructions stored thereon for executing the steps of claim 1.

19. A non-transitory computer-readable medium having instructions stored thereon and related to at least two devices according to claim 10, the instructions being for executing the steps of:

receiving, at a first electronic device, a voice command from a user;

calculating, using a first proximity sensor in the first electronic device, a first parameter indicative of a physical distance between the first electronic device and the user;

receiving, at a second electronic device, the voice command from the user;

calculating, using a second proximity sensor in the second electronic device, a second parameter indicative of a physical distance between the second electronic device and the user;

analyzing the first parameter relative to the second parameter and based upon the analyzing determining an electronic device closest to the user; and carrying out an operation, in response to the voice command, using a voice assistant service running on the electronic device closest to the user.

* * * * *